May 7, 1963    D. J. W. BLACKHALL ET AL    3,088,705
WEDGE TYPE VALVES FOR FLUIDS
Filed July 1, 1960    3 Sheets-Sheet 1

INVENTOR
Douglas J.W. Blackhall
BY
ATTORNEY

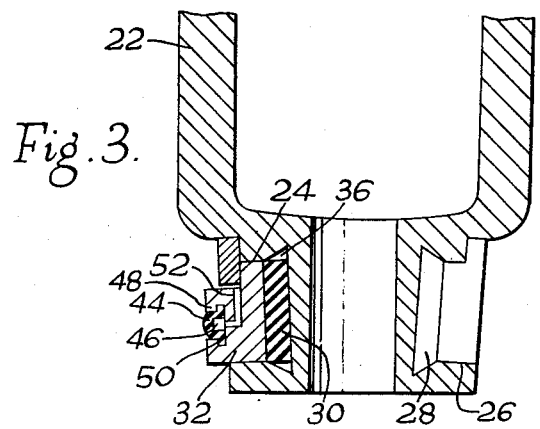
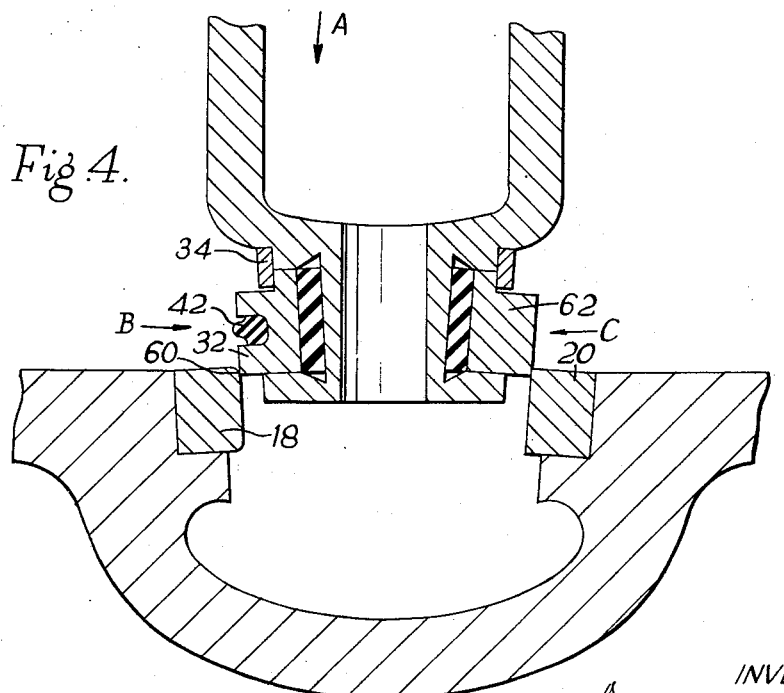

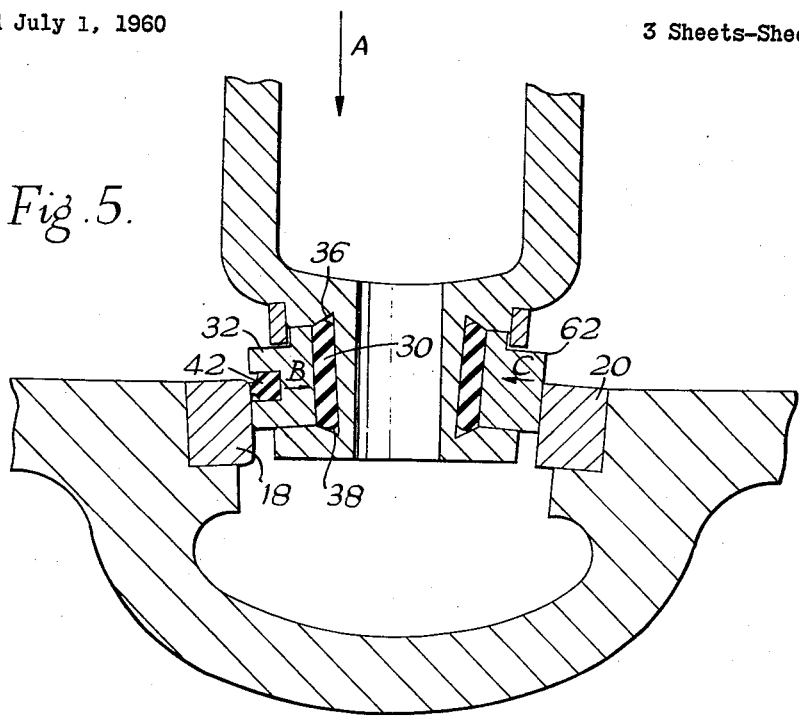
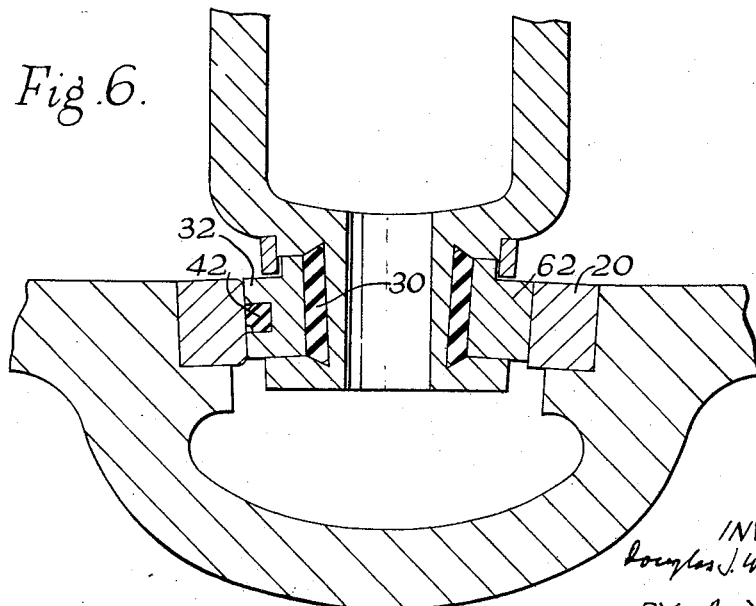

United States Patent Office 3,088,705
Patented May 7, 1963

3,088,705
WEDGE TYPE VALVES FOR FLUIDS
Douglas J. W. Blackhall, Brighouse, and Thomas Robertson, Lightcliffe, Halifax, England, assignors to J. Blakeborough & Sons Limited, Brighouse, England
Filed July 1, 1960, Ser. No. 40,480
7 Claims. (Cl. 251—187)

For certain applications of wedge type valves it is important that there should be no leakage from the pipe portion of the body to the casing containing the valve closure member when this is in the closed position. However, it is very difficult to prevent any leakage, due to distortion of the valve body under internal pressure and sometimes as a result of strains imposed on the body by the adjoining piping. A further source of possible leakage is the presence of small particles of solid matter between the sealing faces which prevent correct sealing. The object of this invention is to provide a valve which is constructed so as to obviate or at least to minimize leakage due to the causes just mentioned.

According to this invention, a wedge type valve has a sealing ring which seals between the wedge type closure member and its seat for preventing fluid flow through the valve, the sealing ring having a resiliently deformable loading member on its inside, the loading member being enclosed in a space within the wedge type closure member or the valve body around the valve seat, which space is of such a size and shape that there are one or more voids adjacent to the loading member when the latter is unloaded and the arrangement being such that in the fully open position of the closure member, the sealing ring projects further from the closure member than it does in the fully closed position, whereby as the valve is being closed, the sealing ring scrapes over and in pressure contact with the seat, the movement of the sealing ring into the closure member being permitted by deformation of the loading member into the void or voids.

Preferably, the resilient mounting comprises a solid rubber ring of rectangular cross-section fitted within an annular groove of trapezoidal cross-section formed in the member on which the sealing ring is mounted so that when the wedge is forced into the closed position, the rubber ring is deformed and fills up the spaces in the groove, this deformation providing "stored" energy which is available to press on any portion of the sealing ring into sealing contact with its co-operating surface in the event of distortion of the valve body which would otherwise separate the sealing ring and its co-operating surface. The sealing ring which is resiliently mounted may be on the wedge or on the valve body, but it is preferred to mount it on the wedge, and since the latter is usually required to form a seal on both sides it will generally be necessary to provide the wedge with two resiliently mounted sealing rings.

Another preferred feature of this invention which is designed particularly to overcome the difficulty created by solid particles between the sealing faces, is the provision of a deformable ring on the seal forming surface of a sealing ring. The deformable ring may conveniently be made of rubber and means may be provided for applying pressure to the deformable ring to force it towards its co-operating surface.

The invention will be more particularly described by way of example, with reference to the accompanying drawings in which:

FIGURE 3 is a view similar to FIGURE 2, but showing a modified construction.

FIGURE 4 is a sectional view showing the position of the wedge member and its various parts at the commencement of the final part of the closure of the valve;

FIGURE 5 is a view similar to FIGURE 4, but showing the position after the wedge member has been moved further towards the fully closed position, and FIGURE 6 is a view similar to FIGURE 4, but showing the wedge member in the fully closed position.

Figure 1:
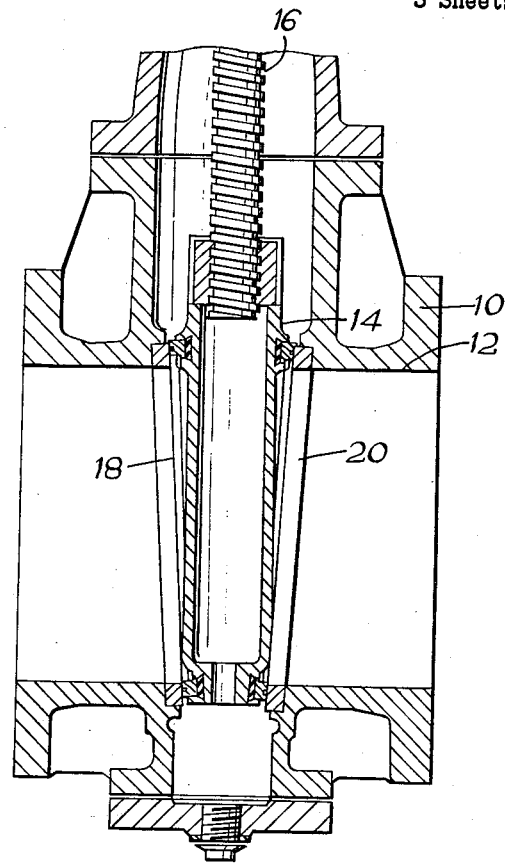
FIGURE 1 is a vertical longitudinal section through a wedge valve, in the fully closed position.

The general features of the valve need not be described in detail because they are common practice in wedge valve construction. In FIGURE 1, 10 is the valve body having a straight through bore 12, which can be closed by a wedge 14 slidable vertically across the bore. A screw 16 is used for raising and lowering the wedge (there being a handwheel, not shown, for operating the screw) and a pair of nickel bronze seating rings 18 and 20 are fitted in the body 10.

The wedge has a body 22 which on each side is formed with an annular sealing ring groove 24. Each groove 24 comprises an outer parallel sided portion 26 and an inner section 28 of trapezoidal cross section, as shown in FIGURES 2 and 3.

Figure 2:
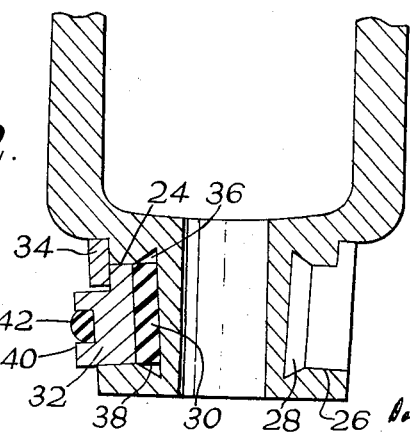
FIGURE 2 is an enlarged detail sectional view of part of the wedge, showing a sealing ring fitted at one side only.

Referring to the arrangement shown in FIGURE 2, a ring 30 of rubber or similar resilient deformable material is placed in the inner section 28 of the groove, and a nickel bronze sealing ring 32 is placed in the outer section 26 of the groove. The ring 32 is a sliding fit within the outer section 26, and is held in position by a retaining ring 34 which is screwed to the body 22 of the wedge. The rubber ring 30 is about equal in width to the sealing ring 32, so that when in position and in the uncompressed state it leaves two voids 36 and 38 triangular in cross-section behind the sealing ring.

The front face of the sealing ring (i.e. the face which is nearest to the co-operating surface of the seating ring 18 or 20) is formed with an annular groove 40, and a solid rubber face ring 42 of semi-circular cross-section is fixed in this groove, with the curved surface of the face ring protruding slightly from the groove.

FIGURES 4, 5 and 6 illustrate the operation of the sealing arrangement, and on the left hand side of the wedge member there is shown a sealing ring 32 provided with a face ring 42, whereas on the right hand side there is shown a sealing ring 62 which does not have a face ring. The arrow A indicates the direction of movement of the wedge member during closure, and the arrows B and C indicate respectively the direction of movement of the rings 32 and 62 during closure.

When the valve is open, there are no forces acting on the ring 32, which is, therefore, pressed outwardly by the rubber ring 30, and is retained by the ring 34. When the valve is being closed, the position is reached, shown in FIGURE 4, where the metal ring 32 just engages with the metal ring 18. To ensure that the metal rings do not have end-to-end engagement, which would jam the valve, the inside edge of the ring 18 is radiused as shown at 60.

Further downward movement of the wedge member causes the sealing ring to be moved inwardly in the direction of the arrow B, and this causes deformation of the rubber ring 30 into the voids 36 and 38 as shown in FIGURE 5. Eventually the fully closed position, shown in FIGURE 6, is arrived at, where it is impossible to move the wedge member further downwards, and the rubber ring 30 practically fills up the voids 36 and 38.

During the downward movement just described, the sealing ring 32 is kept pressed into contact with the ring 18, and this metal to metal contact provides a very good wiping action for clearing the sealing surfaces of the rings. Furthermore the face ring 42 is also pressed inwardly and this also tends to wipe the face of the ring 18. The action of the sealing ring 62 is exactly the same as that of the ring 32.

The main purpose of the face ring is to assist in forming the seal with the co-operating surface of the seating ring, and due to its properties of deformation and resilience, if there are solid particles between the co-operating surface and the face ring they will become encased in the face ring without breaking the seal.

The rubber used for the rings 30 and 42 is of a type which readily recovers its original form after having been distorted for an appreciable length of time, and when the valve is for use in certain conditions such as in oil tanker ships, it must also be resistant to hydrocarbon oils, sea water and hot caustic washing solutions. A suitable rubber for this application is the nitrile type. However, for other applications different types of rubber should be used.

In the alternative arrangement, shown in FIGURE 3, the face ring 44 is recessed around its rear face as indicated at 46 and formed with annular lips 48 and 50 which engage in annular recesses around the groove in which the face ring is seated. A port 52 is provided in the sealing ring 32 leading from one of the faces of the sealing ring which is exposed to liquid pressure in the valve to the space in the sealing ring behind the face ring which space is created by the recess 46 in the rear of the face ring. Thus the rear of the face ring is subjected to the pressure of the liquid in the valve and this pressure urges the face ring towards its co-operation surface.

It will be appreciated that the sealing rings described above could be fitted in the valve body instead of in the wedge if desired.

We claim:

1. A wedge-type fluid control valve, having a valve seat, a wedge-shaped closure member movable toward and away from a closed position to control the flow of fluid through the valve, each face of said closure member directed toward the valve seat, having a ring space therein, a sealing ring fitted to said ring space, said sealing ring being operative to provide a metal to metal seal contact between the valve seat and the closure member, said sealing ring being movable within said ring space toward and away from the valve seat, a resiliently deformable loading member located within the portion of the ring space behind the sealing ring, the portion of the ring space occupied by said loading member being of substantially trapezoidal cross-sectional contour, the resilient loading member being of such size and shape that it does not completely fill said portion of the ring space when not under load, a retaining ring fixedly attached to the closure member in engagement with the sealing ring, said retaining ring being operative to retain the loading member within the ring space, said sealing ring projecting from said closure member by such a distance that it will engage and be moved by the valve seat during the process of closing the valve.

2. A wedge-type valve as in claim 1, in which the loading member is of substantially rectangular cross-section, the length of the rectangle being substantially equal to the length of the shorter of the parallel faces of the portion of the ring space of trapezoidal cross-section.

3. A wedge-type valve as in claim 2, in which the loading member is a solid ring of a rubber composition.

4. A wedge-type fluid control valve having a valve seat, a wedge-shaped closure member movable towards and away from a closed position to control the flow of fluid through the valve, each face of said closure member directed toward the valve seat having a ring space therein, a sealing ring fitted to said ring space, said sealing ring being operative to provide a metal to metal seal contact between the valve seat and the closure member, said sealing ring being movable within said ring space toward and away from the valve seat, a resiliently deformable loading member located within the portion of the ring space behind the sealing ring, the portion of the ring space occupied by said loading member being of substantially trapezoidal cross-sectional contour, the resilient loading member being of such size and shape that it does not completely fill said portion of the ring space when not under load, a retaining ring fixedly attached to the closure member in engagement with the sealing ring, said retaining ring being operative to normally retain the loading member within the trapezoidal portion of the ring space, said sealing ring having an annular groove in the surface thereof directed toward the valve seat, a second resiliently deformable member inserted into said annular groove, the outer surface of said second resiliently deformable member being of arcuate cross-sectional contour, said sealing ring and the second resiliently deformable member, projecting from said closure member by such a distance that the sealing ring will engage and be moved by the valve seat during the process of closing the valve, said second resiliently deformable member being operative to engage the valve seat simultaneously with the sealing ring.

5. A wedge-type fluid control valve as in claim 4, in which the loading member is a solid ring of a rubber composition, said loading member being of substantially rectangular cross-section, the length of the rectangle being substantially equal to the shorter of the parallel faces of the portion of the ring space of trapezoidal cross-section, the second resilient member being a solid ring of a rubber composition.

6. A wedge-type fluid control valve as in claim 4, in which the loading member is a solid ring of a rubber composition, the second resiliently deformable member being a solid ring of a rubber composition.

7. A wedge-type valve, as in claim 5, in which the second resiliently deformable member is recessed on its rear side, the sealing ring having a port therethrough in direct communication with the recess in the second resiliently deformable member, said port leading from a surface of the sealing ring which is in direct communication with fluid under pressure when the valve is closed, to the rear of the second resiliently deformable member.

References Cited in the file of this patent

UNITED STATES PATENTS

| | | |
|---|---|---|
| 2,640,677 | Craven | June 2, 1953 |
| 2,776,813 | Blackman | Jan. 8, 1957 |
| 2,850,260 | Perazone | Sept. 2, 1958 |
| 2,870,987 | Greenwood | Jan. 27, 1959 |
| 2,889,134 | Bryant | June 2, 1959 |

FOREIGN PATENTS

| | | |
|---|---|---|
| 724,578 | Great Britain | Feb. 23, 1955 |
| 781,122 | Great Britain | Aug. 14, 1957 |
| 821,756 | Great Britain | Oct. 14, 1959 |